(12) United States Patent
Spanger

(10) Patent No.: US 7,614,662 B2
(45) Date of Patent: Nov. 10, 2009

(54) PIPE FITTING WITH ORIENTATION INDICATOR

(76) Inventor: Gerald S. Spanger, 402 Merrywood Dr., Edison, NJ (US) 08817

( * ) Notice: Subject to any disclaimer, the term of this patent is extended or adjusted under 35 U.S.C. 154(b) by 400 days.

(21) Appl. No.: 11/418,213

(22) Filed: May 5, 2006

(65) Prior Publication Data

US 2007/0257483 A1    Nov. 8, 2007

(51) Int. Cl.
*F16L 35/00* (2006.01)
(52) U.S. Cl. .............. 285/93; 33/370; 33/384
(58) Field of Classification Search .......... 285/93, 285/133.4; 33/384, 370, 371, 349
See application file for complete search history.

(56) References Cited

U.S. PATENT DOCUMENTS

| | | | | |
|---|---|---|---|---|
| 520,988 | A * | 6/1894 | Harrington | 285/55 |
| 1,108,259 | A * | 8/1914 | Sixma | 285/383 |
| 4,164,817 | A * | 8/1979 | Walker | 33/371 |
| 4,589,213 | A * | 5/1986 | Woodward | 33/371 |
| 4,893,846 | A * | 1/1990 | McGraw | 285/133.4 |
| 4,947,556 | A * | 8/1990 | Peil | 33/370 |
| 5,069,042 | A | 12/1991 | Stuchlik | |
| 5,522,229 | A | 6/1996 | Stuchlik et al. | |
| 5,568,265 | A | 10/1996 | Matthews | |
| 5,755,105 | A | 5/1998 | Lacoste | |
| 5,800,099 | A * | 9/1998 | Cooper | 408/1 R |
| 6,052,911 | A * | 4/2000 | Davis | 33/286 |
| 6,056,002 | A * | 5/2000 | Morlok | 137/15.03 |
| 6,124,935 | A | 9/2000 | Matthews | |
| 6,322,326 | B1 | 11/2001 | Davis et al. | |
| 6,343,480 | B1 | 2/2002 | Correa et al. | |
| 6,393,708 | B1 * | 5/2002 | Culver et al. | 33/397 |
| 6,442,955 | B1 | 9/2002 | Oakner et al. | |
| 6,588,226 | B1 | 7/2003 | Semrow et al. | |
| 6,662,457 | B2 * | 12/2003 | Dameron | 33/286 |
| 6,745,580 | B1 | 6/2004 | Brown | |
| 6,895,770 | B1 | 5/2005 | Kaminski | |
| 6,976,367 | B2 | 12/2005 | Spanger | |
| 6,996,911 | B1 * | 2/2006 | Dinius | 33/481 |
| 2005/0138939 | A1 | 6/2005 | Spanger | |
| 2005/0138940 | A1 | 6/2005 | Spanger | |

* cited by examiner

*Primary Examiner*—David E Bochna
(74) *Attorney, Agent, or Firm*—Oliff & Berridge, PLC

(57) ABSTRACT

A fitting is provided with an integral orientation indicator that can be permanently fixed to or detachable from the fitting. The orientation indicator allows the installer of the fitting to ensure that the fitting, as well as the upstream and downstream parts of the fluid conveying system associated with the fitting, are properly oriented so that liquid will flow in the desired direction. When the fitting is connected to the primary condensate outlet of the drain pan on a central air conditioning unit, the orientation indicator can be used to ensure that liquid will flow out of the drain pan.

17 Claims, 5 Drawing Sheets

PIPE FITTING WITH ORIENTATION INDICATOR

BACKGROUND

The invention relates to pipe fittings for use in conveying drainage fluid, and in particular for use in conveying condensate that is drained from a drain pan of an air-cooling (de-humidifying) unit.

As a fundamental part of the physics of cooling, all air conditioners extract water from the air when they are in the cooling mode. This water, known as condensate, must be removed from the air conditioning unit and piped to outside the building. If this is not adequately or correctly done, the condensate water will overflow the drain pan of the air conditioner (as used herein "air conditioner" refers to standard air conditioners, heat pumps and to any type of de-humidifying unit), possibly causing extensive water damage to the building structure and/or building finishes and/or the contents of the building. The overflow of condensate also can provide ideal conditions for the growth of mold in those areas that are continually wetted and can seriously compromise the air quality inside the building, as well as possibly have adverse affects on the health of the occupants. Some systems for preventing condensate overflow are described on U.S. Pat. No. 6,976,367, the disclosure of which is incorporated herein by reference in its entirety. Also see U.S. Pat. No. 5,069,042 and U.S. Pat. No. 5,522,229, the disclosures of which are incorporated herein by reference in their entireties.

The condensate drain outlet of a central air conditioning unit is a critical part of the operation of the air conditioner because it forms the primary exit point for the condensate water that is collected in the drain pan inside the air conditioning unit when it is operating in the cooling mode. Currently, most drain pans have two outlets. The first (lower) outlet provides primary drainage of the condensate water, and the other outlet is a secondary (upper) outlet to provide a backup overflow outlet in case of a blockage in the primary drain outlet. Typically, the secondary outlet is situated ½-¾ inches above the primary outlet to ensure that any condensate water produced will first run out of the lower primary outlet. The secondary outlet will only become operative if there is an increase in the water level due to a blockage in the lower or primary drain outlet, causing the water to then run out from the secondary outlet. An example of a drain pan having primary and secondary drain outlets can be found in U.S. Pat. No. 5,755,105, the disclosure of which is incorporated herein by reference in its entirety.

Current designs of central air conditioning systems utilize this dual outlet system to evacuate the condensate water produced when the unit is in a cooling mode. All manufacturers of air conditioning units routinely and specifically require that their equipment is fitted with a trap as part of the installation process. A number of local building codes and some national building codes also mandate the use of traps just downstream of the primary drain outlet. The purpose of the trap is to ensure that any condensate water that is produced can flow freely out through the drain pipe system through the force of gravity, while at the same time ensuring that no air can pass through the trap in either direction. The water seal formed by the trap thus prevents cool air from inadvertently exiting through the drainage line, while preventing warm air from entering the cooling system through the drainage line.

It is absolutely imperative that the trap and the connecting stub that is fitted to the primary drain outlet of the air conditioning unit are correctly oriented. That is, the trap and connecting stub must be oriented with sufficient slope to ensure unimpeded flow of condensate liquid out of the drain pan of the air conditioning unit. If this is not done, the condensate water will not be able to flow freely, and may back-up inside the drain pan. If an overflow switch has been provided in the drain pan, such back-up will cause the overflow switch to operate every time the unit runs in the cooling mode, causing many unnecessary return visits by a technician. If no overflow switch has been fitted, the condensate water may overflow the drain pan, causing damage inside the unit and possibly leading to damage to the building and potential mold growth.

Some air conditioning units are designed with a built-in slope in the drain pan to promote proper drainage. However, if the air conditioning unit is installed with a slope in the opposite direction, it can negate this drain pan slope and cause the condensate flow to back-up. Even if the drain pan is properly oriented, an improperly oriented drainage flow system downstream of the drain pan (for example, a drainage flow system with an upward slope) could cause the drain pan to overflow by preventing the gravity flow of liquid out of the drain pan.

SUMMARY

A hollow fitting is provided with an integral orientation indicator that can be permanently fixed to or can be detachable from the fitting. The orientation indicator allows the installer of the fitting to ensure that the fitting, as well as the upstream and downstream parts of the fluid conveying system, are properly oriented so that liquid will flow in the desired direction. When the fitting is connected to the primary condensate drain outlet of the drain pan on a central air conditioning unit, the orientation indicator can be used to ensure that liquid will flow out of the drain pan. For example, once the fitting is attached to the primary condensate drain outlet of the drain pan, the orientation indicator will indicate the orientation of the fitting, as well as the orientation of the drain pan attached to the fitting. Thus, if the drain pan and/or the air conditioning unit having the drain pan is/are not properly installed, the air conditioning unit and/or the drain pan within the air conditioning unit can be re-oriented to ensure that condensate flows in the proper direction.

In addition, even if the air conditioning unit and drain pan are properly installed, improper installation of the fitting and its downstream drain line components (for example the trap and drainage flow line) must be ensured. The orientation indicator thus also enables the installer to ensure that the drainage system is installed with the proper orientation to ensure the outflow of condensate liquid from the air cooling system.

According to one embodiment, the fitting includes a hollow tube having an inlet for receiving liquid and an outlet for emitting the liquid, and an orientation indicator that is attached to the hollow tube and that indicates an orientation of the hollow tube. As noted above, the orientation indicator can be permanently attached to the hollow tube (for example, molded as part of the hollow tube when the hollow tube is made from plastic), or the orientation indicator can be detachable from the hollow tube. When the orientation indicator is detachable, it can be used with a plurality of different fittings. According to one embodiment, the orientation indicator is attached to a side wall of the hollow tube. In addition, the indicator can be adjustably attached to the hollow tube so that it can be used to orient the tube at different slopes.

According to one embodiment, the orientation indicator indicates an orientation of the inlet of the hollow tube. For example, the orientation indicator indicates an orientation of a longitudinal axis of the inlet of the hollow tube. Thus, for example, when the orientation indicator indicates a horizontal orientation, this means that the longitudinal axis of the hollow tube is horizontal or has some predefined slope depending on the angle at which the indicator is fixed to the hollow tube. If the hollow tube is not perfectly straight (for example, if the hollow tube includes a U-shaped trap or has other shapes), it is preferable that the orientation indicator indicates an orientation of a longitudinal axis of the inlet of the hollow tube because the inlet is attached to the outlet of the drain pan.

The orientation indicator can be an electronic orientation indicator or a sealed chamber containing liquid and a bubble within the sealed chamber (referred to as a "spirit level") or other type of mechanical orientation indicator.

As noted above, the hollow tube can have a variety of shapes. The hollow tube may be straight, have one or more bends, have an L-shape, have a T-shape, have a cross-shape, and/or include a U-shaped or other type of trap.

The fitting can have a variety of types of couplings on its inlet and outlet. The couplings can be threaded couplings, force-fit couplings, quick-connect/disconnect couplings, and can be female or male couplings, for example.

According to one aspect of the invention, a method of attaching a fitting to a condensate drain pan of an air-conditioning system includes: (i) connecting the inlet of a fitting that includes a hollow tube and an integral orientation indicator to the outlet of a condensate drain pan, (ii) observing the indication provided by the orientation indicator, and (iii) adjusting an orientation of the drain pan and/or the hollow tube, until the orientation indicator indicates an orientation that facilitates the flow of liquid out of the drain pan.

BRIEF DESCRIPTION OF THE DRAWINGS

Various exemplary embodiments of the invention are described in detail with reference to the following figures in which.

DETAILED DESCRIPTION OF EXEMPLARY EMBODIMENTS

Figure 1:
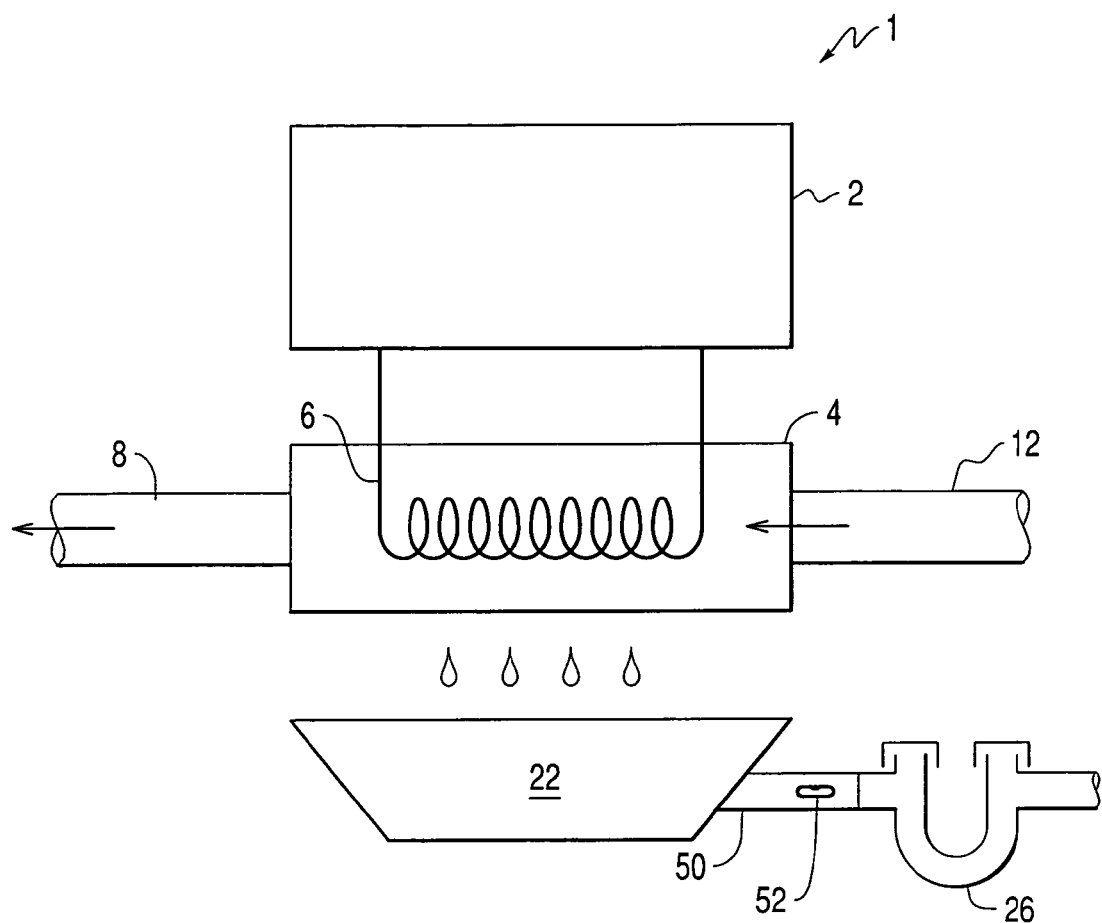
FIG. 1 is a diagrammatic view of an air cooling system incorporating a fitting according to one embodiment of the invention.

FIG. 1 illustrates an air cooling system 1 including a drainage system in which a drain pan 22 receives condensate liquid that is generated by an air conditioner 2 of the air cooling system 1. The air conditioner 2 is coupled to an air handler 4 and circulates and cools a coolant passing through the air conditioner 2. The air handler 4 contains heat exchange coils 6 through which the cold coolant circulates. Warm air is conveyed to the air handler 4 through an inlet duct 12. The warm air is cooled as it makes contact with the exchange coils 6. The cool air is then transported away from the air handler 4 through an outlet duct 8. When the warm air is cooled, moisture in the air condenses on the heat exchange coils 6 as liquid droplets or condensate.

The condensate must be drained from the air conditioner. As such, and as is well known, a drain pan 22 collects the condensate as it drips from the heat exchange coils 6. The collected condensate then is drained from the drain pan 22. In the FIG. 1 embodiment, a fitting 50 according to embodiments of the invention has an inlet and an outlet, with the inlet connected to the primary drain outlet of the drain pan 22. Thus, the condensate exits the drain pan 22 through the fitting 50. The outlet of the fitting 50 is connected to a U-shaped trap 26 as described earlier and as well known in the art. See, for example, U.S. Pat. No. 5,522,229, the disclosure of which is incorporated herein by reference in its entirety. Also see U.S. Pat. No. 6,976,367, the disclosure of which is incorporated herein by reference in its entirety. In accordance with embodiments of the invention, the fitting 50 includes an orientation indicator 52 to be described in more detail below.

Preferably, the fitting 50 is a hollow body tubular structure made of plastic, such as polyvinyl chloride (PVC), thermoplastic, etc. Of course, metal, brass, aluminum or steel, or a ceramic could be used. According to some embodiments, the fitting 50 (as well as the U-shaped trap and other optional piping of the drainage system) can be transparent so that clogs can be identified.

Figure 9:
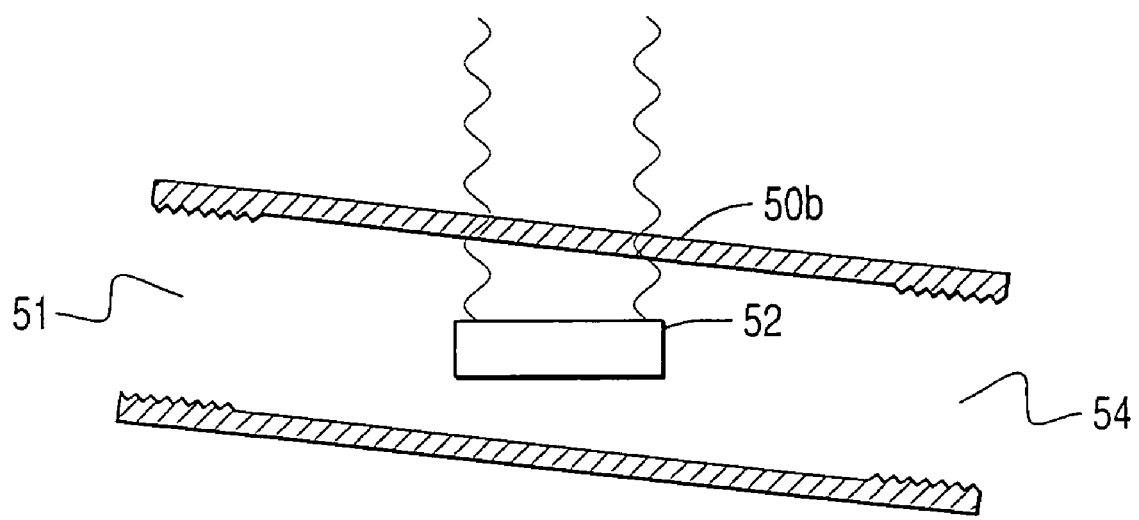
FIG. 9 illustrates a fitting in which the orientation indicator is an electronic orientation indicator.

The orientation indicator 52 can be any of various known orientation indicators. Some examples include a spirit level, which is formed from a tubular chamber filled with a liquid and containing a bubble, as is well known in the art, other types of mechanical orientation indicators, or an electronic orientation indicator such as that illustrated, for example, in FIG. 9 can be used. The orientation indicator can be permanently fixed to the fitting 50 (for example, by molding it with the fitting when the tubular body is molded) or by gluing it to the fitting. Alternatively, the orientation indicator can be removably fixed to the fitting. One advantage of using a removable orientation indicator is that it could be used with a plurality of fittings, with the installer removing the orientation indicator from the fitting once installation of a particular drainage system is completed. Because a spirit level-type indicator is relatively inexpensive and can be readily formed with the fitting during the molding process, when a spirit level-type indicator is used, it preferably may be permanently fixed to the fitting. Permanently fixing the indicator to the fitting also is advantageous in that the orientation of the level indicator relative to the longitudinal axis of the fitting is fixed.

Figure 8:
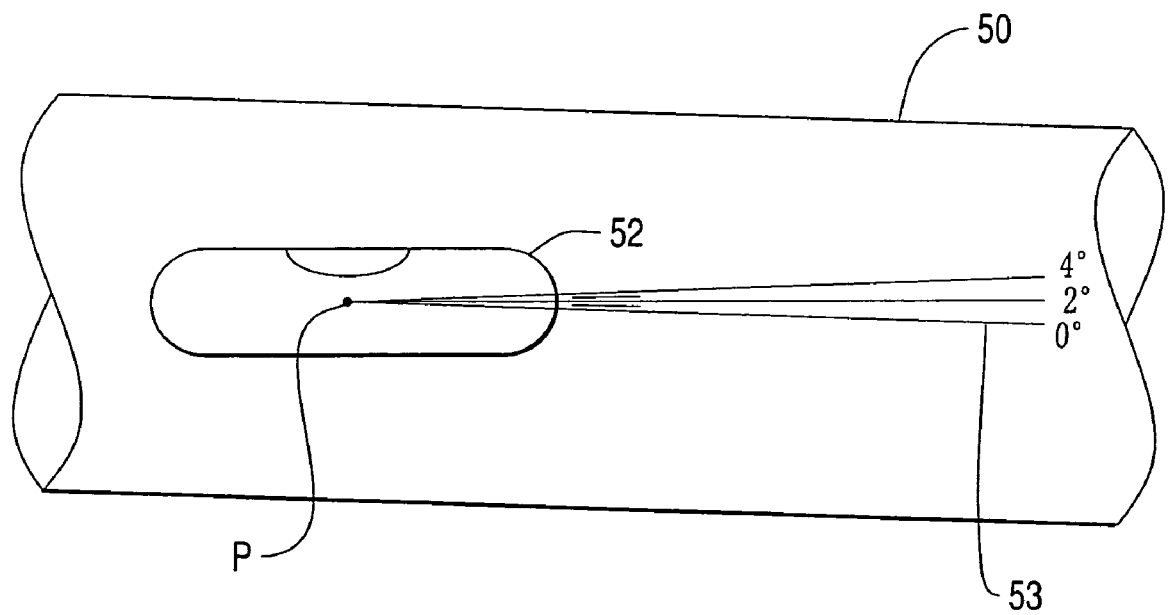
FIG. 8 illustrates a fitting in which the orientation indicator is adjustably attached to the fitting according to another embodiment of the invention.

When a mechanical orientation indicator (such as a spirit level) is fixedly attached to the fitting, the fixed position preferably is such that when the indicator indicates a particular orientation (for example, a horizontal orientation), the axis of the inlet of the fitting has a desired, predetermined orientation (for example, sloping downward at a desired angle, of, for example, 1°-5°). For example, many building codes require a slope of 0.25 inch vertical drop for each one foot of horizontal run of the drain pipe. As an alternative to having a single fixed position of the orientation indicator, the orientation indicator could be adjustably (variably) attachable to the fitting so that the user could change the amount of slope that the axis of the inlet of the fitting will have when the indicator indicates a horizontal orientation. FIG. 8 shows an example of an orientation indicator that is adjustably attachable to the fitting. In FIG. 8, the indicator 52 (which is a spirit level), can rotate about point P and thus it is adjustably attached to the fitting 50. Indicia 53 are disposed on the fitting adjacent to the spirit level. The indicia 53 indicate the amount of downward slope in the axis of the inlet of the fitting 50 when the bubble of the spirit level is at the center of the liquid-filled chamber of the spirit level (that is, when the spirit level indicates a horizontal orientation). If an electronic type of orientation indicator is used, it is not necessary for the electronic orientation indicator to be adjustably attached to the fitting because the electronic orientation indicator can indicate a range of angles (slopes) even if it is in a fixed position relative to the axis of the inlet of the fitting. Mechanical orientation indicators that are capable or indicating a range of angles (slopes) also need not be adjustably attached to the fitting. However, orientation indicators that indicate a range of angles (slopes) are more expensive than very simple horizontal-only indicators, and thus in order to minimize cost, it may be preferable to use simple indicators, particularly when the indicator is permanently attached to the fitting.

Figure 2:
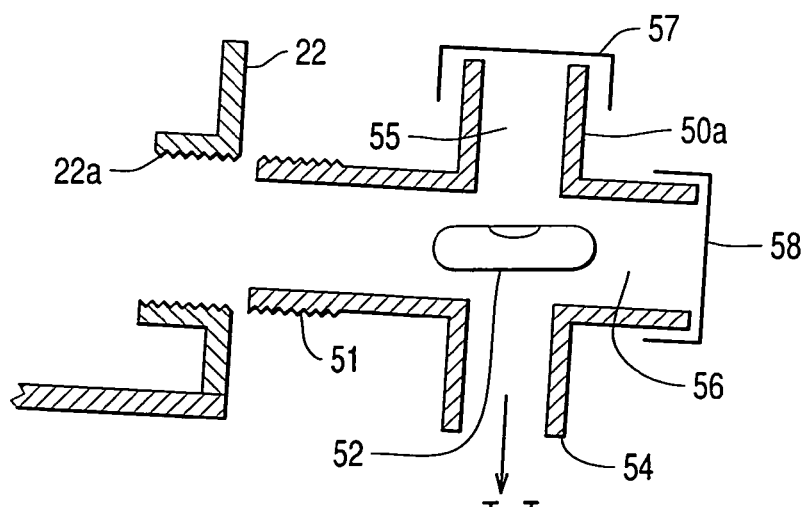
FIG. 2 is a partially cross-sectional view of a fitting according to one embodiment of the invention located adjacent to the drain outlet of a condensate drain pan.

FIG. 2 shows a first embodiment in which the fitting 50a is cross-shaped. The drain pan 22 has a threaded female-type coupling 22a for its primary drain outlet. The fitting 50a includes a threaded male-type coupling on its inlet 51. The outlet 54 of the fitting 50a can be attached to downstream drainage system including, for example, a trap. The coupling on the outlet is a force-type coupling that can be slideably engaged with the inlet of the next part of the drainage system (for example, a trap). One or more O-rings can be disposed between the two force-fit tubes. See, for example, U.S. Pat. No. 5,069,042, the disclosure of which is incorporated herein by reference in its entirety.

The cross-shaped fitting of FIG. 2 includes two additional access opening 55 and 56, each of which is selectively covered by caps 57 and 58, respectively. The caps can be removed in order to permit a person to clean the fitting, as well as the exit of the drain pan 22 (via access opening 56) and the downstream portion of the drainage system such as the trap (via access opening 55). Removal of one or more of the caps facilitates mechanical cleaning (for example with a brush), flushing or introduction of chemicals or cleaning materials. See, for example, the above-incorporated U.S. Pat. No. 5,522, 229 and U.S. Pat. No. 6,976,367. The fitting may include an electronic or mechanical self flush mechanism to permit manual or automatic flushing by means of water, compressed air or any other means of propulsion as well as the necessary internal baffles and/or water channeling devices to ensure complete flushing. The fitting also may incorporate a venting mechanism to prevent airlocks.

The orientation indicator 52 of the FIG. 2 fitting is disposed on the outer surface of the fitting 50a. FIG. 2 illustrates the orientation indicator 52 as being a liquid-filled chamber having a bubble (that is, a spirit level). The orientation indicator 52 is oriented relative to an axis of the inlet 51 of the fitting 50a such that the orientation indicator 52 indicates the orientation of the inlet axis. For example, and as noted previously, the orientation indicator can be fixed to the outer surface of the fitting such that when the indicator indicates a particular orientation (for example, a horizontal orientation), the axis of the inlet of the fitting has a desired, predetermined orientation (for example, sloping downward at a desired angle, of, for example, 1°-5°).

In addition, when fitting 50a is attached to the outlet 22a of the drain pan 22 the orientation indicator 52 also will indicate the orientation of the drain pan 22, and thus will provide information that might indicate that the drain pan and/or the air conditioning unit needs to be adjusted to provide the desired outflow of condensate liquid.

Figure 3:
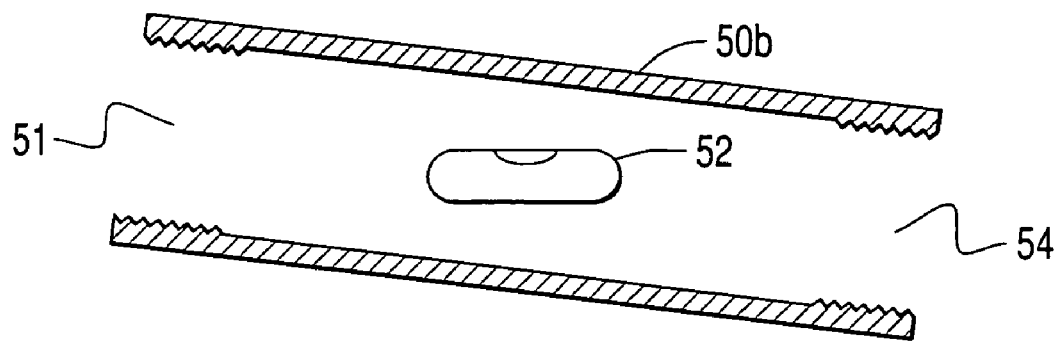
FIG. 3 is a side view of a straight fitting according to another embodiment of the invention.

FIG. 3 illustrates a second embodiment of the fitting 50b. The FIG. 3 embodiment includes threaded female-type couplings at the inlet 51 and outlet 54 of the fitting 50b. A similar type of orientation indicator 52 is provided on the outer surface of the fitting 50b.

Figure 4:
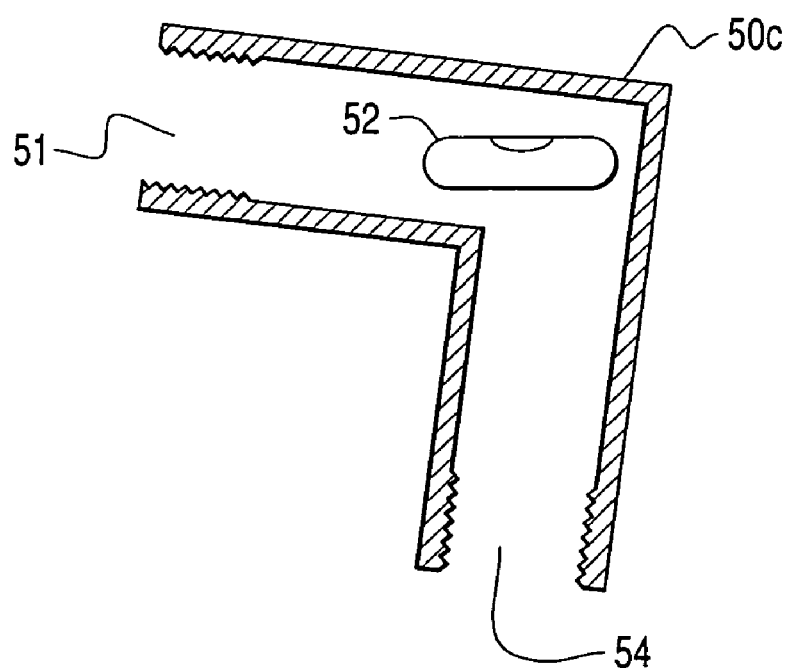
FIG. 4 is a side view of a L-shaped fitting according to another embodiment of the invention.

A third embodiment of a fitting 50c is illustrated in FIG. 4. The FIG. 4 embodiment is L-shaped and has threaded female-type couplings on its inlet 51 and outlet 54. Again, the orientation indicator 52 is disposed so as to indicate the orientation of the longitudinal axis of the inlet opening 51.

Figure 5:
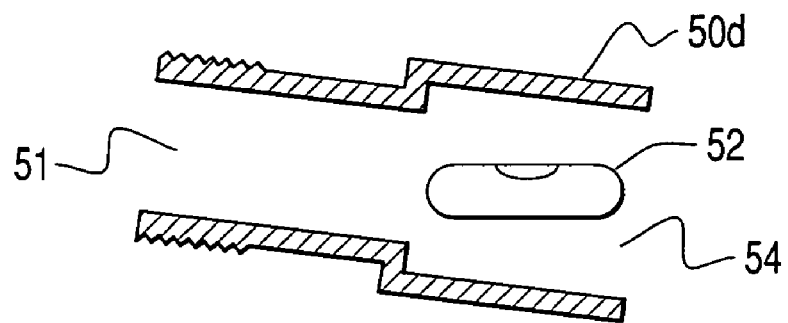
FIG. 5 is a side view of a fitting that is a male adapter according to another embodiment of the invention.

FIG. 5 illustrates a fitting 50d that functions as a male adaptor. The fitting is straight but has a male-type coupling at its inlet 51 and a female-type coupling at its outlet 54. The inlet coupling is a threaded coupling, whereas the outlet coupling is a force-fit type coupling. Again, the orientation indicator 52 is disposed on the outer wall of the fitting 50d.

Figure 6:
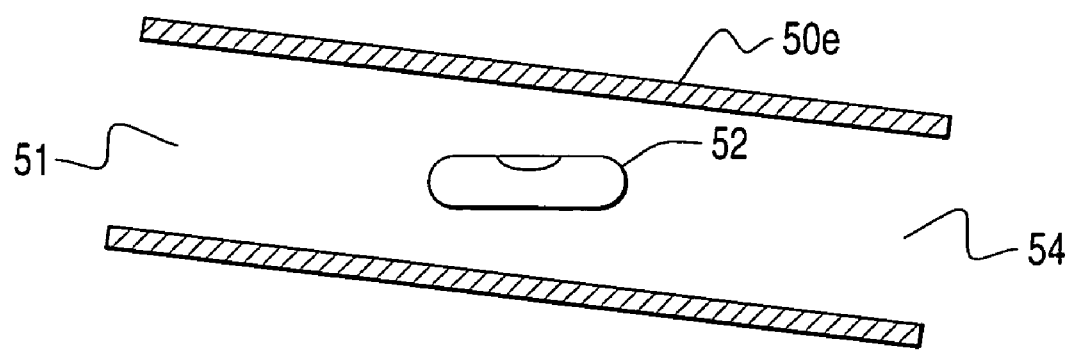
FIG. 6 is a side view of a straight fitting having stub-type (force-fit) couplings according to another embodiment of the invention.

FIG. 6 shows another embodiment of a fitting 50e that is straight. The FIG. 6 embodiment is similar to the FIG. 3 embodiment except that both the inlet opening 51 and the outlet opening 54 have forced-fit type couplings.

Figure 7:
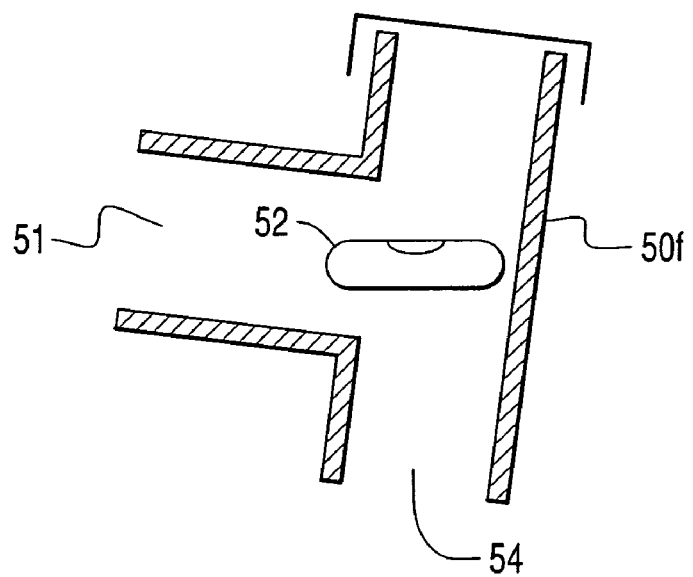
FIG. 7 is a side view of a T-shaped fitting according to another embodiment of the invention.

FIG. 7 shows a T-shaped fitting 50f according to another embodiment of the invention. The inlet opening 51 has a forced-fit type coupling, as does the outlet opening 54. A cap is disposed over the access opening at the top of the fitting. The orientation indicator is disposed on the outer surface of the fitting 50f and again is oriented relative to the longitudinal axis of the inlet 51.

While the invention has been described with reference to preferred embodiments thereof, it is to be understood that the invention is not limited to these embodiments or constructions. The invention is intended to cover various modifications and arrangements. While the various elements of the exemplary embodiments are shown in various combinations and configurations, other combinations and configurations, including more, less or only a single element, also are within the spirit and scope of the invention.

For example, the fitting may be adaptable to enable it to be used for either ¾ inch or 1 inch drain outlets or any other sizes which may be used in air conditioning systems. In addition, the fitting may incorporate a further access opening that could be used for the purpose of introducing cleaning chemicals into the drain pan, overflow fitting, trap and pipe system manually or via an integral or external manually or electrically operated pump. The fitting may be constructed in such a way as to allow full access for mechanical clearing of the fitting itself as well as access into the drain pan to permit the introduction of a borescope, manual cleaning materials or manual dosage of cleaning chemicals into the drain pan or the drain system which is connected to it. The fitting may incorporate integral electrical contacts which would enable it to communicate directly with the air conditioning unit and/or the thermostat and to switch it off and/or sound an alarm in the event of an overflow. These contacts may take the form of a switch which may be mechanical, a reed switch, a Hall-effect switch, an infra red switch, an electronic single or multiple probe sensor or an ultrasonic switch. These contacts may be wired into the air conditioning unit and/or thermostat or it may communicate with either or both of them via radio frequency, infrared or any other wireless protocols and may be internet capable and/or incorporate a modem as well. The fitting may incorporate extended contacts which can sense the water level inside the drain pan.

The fitting may be constructed in such a way that it minimizes the amount of clearance required underneath it thus making it suitable for use in those applications where space restrictions mandate zero clearance. The fitting may incorporate quick connect mechanisms on the outlets which may consist of single or double O rings, single or double O rings in conjunction with a toothed metal locking ring or any other means of quick connection and/or disconnection.

What is claimed is:

1. A fitting for conveying a liquid, the fitting comprising:
   a hollow tube having an inlet for receiving liquid and an outlet for emitting the liquid, at least an upstream portion of the hollow tube that includes the inlet having a tube longitudinal axis; and
   an orientation indicator attached to the hollow tube and that indicates an orientation of the hollow tube relative to a horizontal measurement axis, wherein
   the orientation indicator is attached to the hollow tube such that the horizontal measurement axis is aligned with the tube longitudinal axis of the upstream portion of the hollow tube so as to indicate an orientation of the tube longitudinal axis relative to horizontal, and
   the orientation indicator is attached to the hollow tube such that when the orientation indicator indicates horizontal, the tube longitudinal axis of the upstream portion of the hollow tube has a predetermined non-horizontal orientation.

2. The fitting of claim 1, wherein the orientation indicator is attached to a side wall of the hollow tube.

3. The fitting of claim 1, wherein the orientation indicator is an electronic orientation indicator.

4. The fitting of claim 1, wherein the orientation indicator includes a sealed chamber, liquid and a bubble within the sealed chamber.

5. The fitting of claim 1, wherein the inlet and the outlet are threaded.

6. The fitting of claim 1, wherein the hollow tube is a straight hollow tube.

7. The fitting of claim 1, wherein the hollow tube has at least one bend.

8. The fitting of claim 7, wherein the hollow tube is L-shaped.

9. The fitting of claim 7, wherein the hollow tube is T-shaped and includes an access opening having a removable cap.

10. The fitting of claim 9, further comprising a U-shaped trap attached to the outlet.

11. The fitting of claim 7, wherein the hollow tube is cross-shaped and includes two openings in addition to the inlet and the outlet.

12. The fitting of claim 11, further comprising a U-shaped trap attached to the outlet and caps removably attached to the two openings.

13. The fitting of claim 1, wherein the inlet includes a female coupling and the outlet includes a male coupling.

14. The fitting of claim 1, wherein the inlet includes a male coupling and the outlet includes a female coupling.

15. The fitting of claim 1, wherein the orientation indicator is adjustably attached to an outer surface of the hollow tube.

16. A method of attaching the fitting of claim 1 to a condensate drain pan of an air-handling system, comprising:
    connecting the inlet of the claim 1 fitting to an outlet of the condensate drain pan;
    observing the indication provided by the orientation indicator; and
    adjusting an orientation of the drain pan until the orientation indicator indicates that the orientation of the drain pan facilitates flow of liquid out of the drain pan.

17. The method of claim 16, further comprising attaching a U-shaped trap to the outlet of the fitting.

* * * * *